United States Patent
Iwakiri et al.

(10) Patent No.: US 12,378,333 B2
(45) Date of Patent: Aug. 5, 2025

(54) PHOSPHORYL-CHOLINE-GROUP-CONTAINING VINYL MONOMER

(71) Applicant: NOF CORPORATION, Shibuya-ku (JP)

(72) Inventors: Norio Iwakiri, Kawasaki (JP); Shu Takashima, Kawasaki (JP); Yosuke Matsuoka, Yokohama (JP); Eiji Harata, Handa (JP)

(73) Assignee: NOF CORPORATION, Shibuya-ku (JP)

( * ) Notice: Subject to any disclaimer, the term of this patent is extended or adjusted under 35 U.S.C. 154(b) by 887 days.

(21) Appl. No.: 17/602,828

(22) PCT Filed: Apr. 10, 2020

(86) PCT No.: PCT/JP2020/016110
§ 371 (c)(1),
(2) Date: Oct. 11, 2021

(87) PCT Pub. No.: WO2020/213524
PCT Pub. Date: Oct. 22, 2020

(65) Prior Publication Data
US 2022/0153884 A1    May 19, 2022

(30) Foreign Application Priority Data
Apr. 15, 2019   (JP) ................. 2019-076788

(51) Int. Cl.
*C08F 30/02* (2006.01)
*G02B 1/04* (2006.01)

(52) U.S. Cl.
CPC .............. *C08F 30/02* (2013.01); *G02B 1/041* (2013.01)

(58) Field of Classification Search
CPC ........ C08F 30/02; C08F 130/02; C08F 230/02
See application file for complete search history.

(56) References Cited

U.S. PATENT DOCUMENTS

| | | | |
|---|---|---|---|
| 4,348,329 A | 9/1982 | Chapman | |
| 5,003,065 A | 3/1991 | Merritt et al. | |
| 5,160,740 A | 11/1992 | Hasegawa et al. | |
| 5,368,733 A | 11/1994 | Nakabayashi et al. | |
| 5,461,433 A | 10/1995 | Nakabayashi et al. | |
| 5,466,853 A | 11/1995 | Koinuma et al. | |
| 5,648,442 A | 7/1997 | Bowers et al. | |
| 5,658,561 A | 8/1997 | Nakabayashi et al. | |
| 5,783,650 A | 7/1998 | Bowers et al. | |
| 2013/0059970 A1 | 3/2013 | Driver et al. | |
| 2013/0172592 A1 | 7/2013 | Li et al. | |
| 2014/0288259 A1* | 9/2014 | Yu ..................... | A61Q 17/04 528/26 |
| 2019/0235277 A1 | 8/2019 | Zhang et al. | |

FOREIGN PATENT DOCUMENTS

| | | | |
|---|---|---|---|
| EP | 537972 A1 * | 4/1993 | ............... A61F 2/16 |
| JP | 63-86704 A | 4/1988 | |
| JP | 4-304882 A | 10/1992 | |
| JP | 5-107511 A | 4/1993 | |
| JP | 6-157270 A | 6/1994 | |
| JP | 6-313009 A | 11/1994 | |
| JP | 7-83923 A | 3/1995 | |
| JP | 2006-249148 A | 9/2006 | |
| JP | 2011-246666 A | 12/2011 | |
| JP | 2014-531423 A | 11/2014 | |
| KR | 10-2014-0139337 A | 12/2014 | |
| KR | 10-2014-0139338 A | 12/2014 | |
| TW | 201326264 A1 | 7/2013 | |
| WO | WO 2010/104000 A1 | 9/2010 | |
| WO | WO 2018/135421 A1 | 7/2018 | |
| WO | WO 2019/150260 A1 | 8/2019 | |

OTHER PUBLICATIONS

International Search Report mailed on Jun. 23, 2020 in PCT/JP2020/016110 filed on Apr. 10, 2020 (3 pages).
Sarapas et al., "Thiol-Ene Step-Growth as a Versatile Route to Functional Polymers", Angew. Chem. Int. Ed., 2016, vol. 55, pp. 15860-15863 (5 total pages).
Lim et al., "Development of a Vinyl Ether-Functionalized Polyphosphoester as a Template for Multiple Postpolymerization Conjugation Chemistries and Study of Core Degradable Polymeric Nanoparticles", Macromolecules, 2014, vol. 47, pp. 4634-4644 (11 total pages).
Japanese Office Action issued on Sep. 26, 2023 in Japanese Patent Application No. 2021-514921, 6 pages.
Taiwanese Office Action issued on Jul. 6, 2023 in Taiwanese Patent Application No. 109112580, 6 pages.

* cited by examiner

*Primary Examiner* — Karuna P Reddy
(74) *Attorney, Agent, or Firm* — Oblon, McClelland, Maier & Neustadt, L.L.P.

(57) ABSTRACT

The invention is a phosphorylcholine group-containing vinyl monomer represented by the following formula (1):

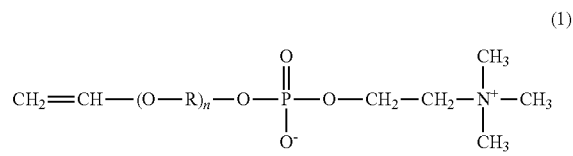

(1)

in the formula (1) R represents an alkylene group having 1 to 6 carbon atoms, and n represents an integer of 1 to 6.

The invention provides a phosphorylcholine group-containing vinyl monomer useful as a raw material for a hydrogel having a lowered water content while maintaining surface hydrophilicity.

7 Claims, No Drawings

PHOSPHORYL-CHOLINE-GROUP-CONTAINING VINYL MONOMER

TECHNICAL FIELD

The present invention relates to a phosphorylcholine group-containing vinyl monomer. The compound of the present invention is useful for medical devices to be in contact with body tissues, and is especially useful as a compound for producing ophthalmic devices, for example, contact lenses, intraocular lenses and artificial corneas.

BACKGROUND ART

2-Methacyloyloxyethyl phosphorylcholine (MPC) has the same structure as that of a phospholipid that constitutes cell membranes, and therefore has various excellent characteristics of biocompatibility, high lubrication characteristics, low friction characteristics, protein adsorption suppression, cell adhesion suppression and bacterial adhesion suppression, and is applied to surfaces of medical devices such as contact lenses, catheters and artificial joints, and also other many medical devices, e.g., medical examination devices such as well plates, and medical diagnostic devices.

Specifically, for the purpose of improving hydrophilicity and imparting protein contamination resistance, a soft contact lens using MPC as a polymerizing monomer has been proposed (see PTL 1).

Clinical results have pointed out that, in wearing contact lenses, an oxygen supply amount from air decreases thereby bringing about mitotic suppression of corneal epithelial cells and corneal hyperplasia. Given the situation, for the purpose of providing more safety contact lenses, improvement of oxygen permeability of materials is tried. Specifically, a silicone hydrogel containing a silicone monomer or a siloxane macromonomer has been developed and productized as one of lens material components.

However, a contact lens using a silicone hydrogel contains a hydrophobic silicone group and therefore has a problem that the lens surface can hardly be hydrophilized. Then, for the purpose of improving the hydrophobicity of the surface of the contact lens using a silicone hydrogel, a method of using a hydrophilic monomer such as N,N-dimethylacrylamide (DMAA), N-vinyl-2-pyrrolidone (NVP) or N-methyl-N-vinylacetamide (MVA) has been proposed. However, even using such a hydrophilic monomer, the hydrophilicity of the lens surface cannot still be said to be sufficient.

On the other hand, a method of obtaining a silicone hydrogel contact lens is known, which includes adding a hydrophilic polymer wetting agent such as a polyvinyl pyrrolidone (PVP) to a monomer composition and polymerizing the composition. However, the wetting agent is not crosslinked in the polymer and therefore dissolves out from the lens during the alcohol extraction step after polymerization or during wearing the lens to thereby bring about a risk of lowering the hydrophilicity of the lens surface to worsen the feel in wearing the lens.

Regarding the method for solving these problems, when an MPC-blended silicone hydrogel contact lens is developed, it may be possible to produce a soft contact lens extremely excellent in oxygen permeability and surface wettability. However, MPC is poorly compatible with a silicone monomer and, for example, when it is dissolved in 2-hydroxyethyl methacrylate (HEMA) and then mixed and copolymerized with a silicone monomer, the resultant hydrous gel whitens (by phase separation) and can hardly attain transparency for a lens material.

However, PTL 2 proposes a siloxane monomer capable of solubilizing MPC, and has obtained good results in point of transparency, surface hydrophilicity and oxygen permeability of lenses.

CITATION LIST

Patent Literature

PTL 1: JP 5-107511A
PTL 2: WO2010/104000A1

SUMMARY OF INVENTION

Technical Problem

Regarding contact lenses, it is generally said that a low hydrous lens may hardly cause eye dry feeling. The lens described in PTL 2 has a relatively high water content, and therefore it is considered that some wearers may cause eye dry feeling and there still remains room for improvement.

The present invention has been made in consideration of the above-mentioned conventional problems, and is to provide a phosphorylcholine group-containing vinyl monomer useful as a raw material for a hydrogel having a lowered water content while maintaining surface hydrophilicity.

Solution to Problem

As a result of intensive studies, the present inventors have found that a low hydrous and high hydrophilic hydrogel can be obtained by synthesizing a compound represented by the following formula (1) and polymerizing it as one raw material monomer, and have completed the present invention.

The present invention includes the following.

[1] A phosphorylcholine group-containing vinyl monomer represented by the following formula (1):

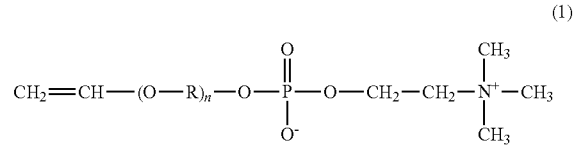

In the formula (1), R represents an alkylene group having 1 to 6 carbon atoms, and n represents an integer of 1 to 6.

[2] A copolymer containing a structural unit derived from the monomer of [1].
[3] A hydrogel formed of the copolymer of [2].
[4] An ophthalmic device formed of the hydrogel of [3].

Advantageous Effects of Invention

According to the present invention, there can be provided a phosphorylcholine group-containing vinyl monomer useful as a raw material for a hydrogel having a lowered water content while maintaining surface hydrophilicity.

DESCRIPTION OF EMBODIMENTS

Hereinunder the present invention is described in more detail.

The phosphorylcholine group-containing vinyl monomer of the present invention has a structure represented by the following formula (1) having both a vinyl group and a phosphorylcholine group.

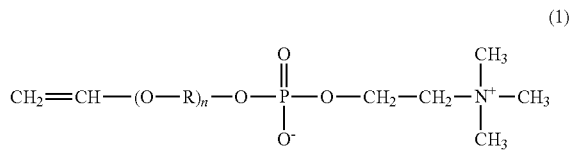

(1)

In the formula (1), R represents an alkylene group having 1 to 6 carbon atoms, and n represents an integer of 1 to 6.

The alkylene group having 1 to 6 carbon atoms represented by R includes a methylene group, an ethylene group, various propylene groups, various butylene groups, various pentylene groups, various hexylene groups, and the like. Here, "various" is meant to include various isomers of each alkylene group.

The compound represented by the formula (1) is, from the viewpoint of giving a hydrogel having a lowered water content while maintaining surface hydrophilicity, preferably a compound where the carbon number of R is 1 to 4 and n is 1 to 4, more preferably a compound where the carbon number of R is 3 to 4 and n is 1 to 2.

For producing the phosphorylcholine group-containing vinyl monomer of the present invention, for example, a compound represented by a formula (2) is reacted with 2-chloro-2-oxo-1,3,2-dioxophosphorane (COP) represented by a formula (3) (first reaction) to give a dioxaphosphorane compound represented by a formula (4), to which trimethylamine is added for ring-opening addition reaction (second reaction). In the formulae (2) and (4), R represents an alkylene group having 1 to 6 carbon atoms, and n represents an integer of 1 to 6.

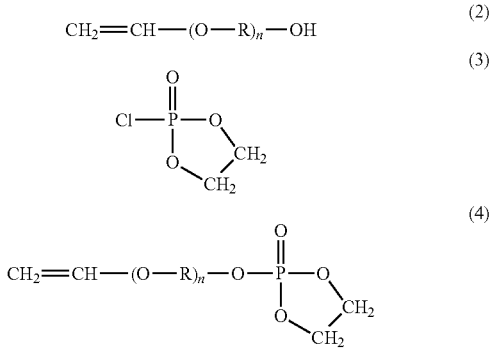

In the above first reaction, preferably, the generated hydrogen chloride is trapped in the presence of an amine such as diisopropylamine or triethylamine, or while an inert gas is blown into the reaction system, the hydrogen chloride is removed out of the system.

The molar ratio of the charged amount of the compound represented by the formula (2) to that of 2-chloro-2-oxo-1,3,2-dioxophosphorane (COP) represented by the formula (3) is preferably 1/0.8 to 1/4, more preferably 1/1 to 1/3.

The molar ratio of 2-chloro-2-oxo-1,3,2-dioxophosphorane (COP) represented by the formula (3) to that of the amine such as diisopropylamine or triethylamine is preferably 1/1 to 1/20, more preferably 1/1 to 1/5.

The dioxaphosphorane compound represented by the formula (4) that is obtained in the first reaction may be subjected to the next second reaction directly as it is, or after isolated and purified.

In the second reaction, the molar ratio of the charged amount of the dioxaphosphorane compound represented by the formula (4) to that of trimethylamine is preferably 1/1 to 1/5, more preferably 1/1 to 1/3.

Preferably, the first reaction and the second reaction each are carried out, for example, in an appropriate solvent such as acetonitrile or ethyl acetate at −20° C. to 80° C. More preferably, the first reaction is at −10 to 10° C., and also more preferably, the second reaction is at 60 to 80° C.

After the reaction, the intended phosphorylcholine group-containing vinyl monomer is isolated and purified according to a method of extraction, distillation, recrystallization, reprecipitation, adsorbent treatment, column treatment, ion-exchanging or gel permeation.

The copolymer of the present invention is a copolymer contains a structural unit derived from the phosphorylcholine group-containing vinyl monomer, and the hydrogel of the present invention is formed of the copolymer of the present invention. The copolymer of the present invention can be obtained, for example, by polymerizing a monomer composition containing the phosphorylcholine group-containing vinyl monomer of the present invention and an ophthalmic silicone monomer. Here, the silicone monomer includes a monomer having at least one Si—O—Si bond and a polymerizable group, and the polymerizable group includes a (meth)acrylate group, a vinyl group, and the like.

In the monomer composition, the content ratio of the phosphorylcholine group-containing vinyl monomer of the present invention is preferably 2 to 50% by mass based on the total amount of the monomer component, more preferably 5 to 30% by mass. When the content ratio of the phosphorylcholine group-containing vinyl monomer is less than 2% by mass, a desired effect base on the phosphorylcholine group can hardly be attained, but when it is more than 50% by mass, the improvement of the desired effect is not so large relative to the content ratio.

The content ratio of the silicone monomer is preferably 20 to 70% by mass based on the total amount of the monomer component, more preferably 30 to 60% by mass. When the content ratio of the silicone monomer is less than 20% by mass, a desired effect base on the silicone monomer can hardly be attained, but when it is more than 70% by mass, the hydrogel can hardly be hydrophilic.

Preferred examples of the ophthalmic silicone monomer include tris(trimethylsiloxy)silylpropyl methacrylate, methylbis(trimethylsiloxy)silylpropyl methacrylate, 2-(methacryloyloxy)ethyl=3-[tris(trimethylsiloxy)silyl]propyl=succinate, (meth)acrylpolydimethylsiloxane, (meth)acrylpolymethylsiloxane, and methyldi(trimethylsiloxy)silylpropylglycerol methacrylate.

As needed, the monomer composition may contain any other hydrophilic monomer. Examples of the other monomer include hydroxy group-containing (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and glycerol (meth)acrylate; ionic group-containing monomers such as acrylic acid, methacrylic acid, styrenesulfonic acid, (meth)acryloyloxyphosphonic acid, and 2-hydroxy-3-(meth)acryloyloxypropyltrimethylammonium chloride; nitrogen-containing monomers such as (meth)acrylamide, aminoethyl methacrylate, N,N-dimethylaminoethyl (meth)acrylate, N-acryloylmorpholine, N-acryloylmorpholine, 2-methacryloyloxyethylphosphorylcholine, and N-vinylpyrrolidone; and polyethylene glycol (meth) acrylate and glycidyl (meth)acrylate. One or more of these may be used.

The monomer composition may contain a polyfunctional compound as a crosslinking agent monomer. Examples thereof include ethylene glycol di(meth)acrylate, tetraethylene glycol di(meth)acrylate, trimethylolpropane tri(meth) acrylate, diethylene glycol divinyl ether, and triethylene glycol divinyl ether. One or more of these may be used.

The monomer composition may further contain still another monomer. Examples of the another monomer include linear or branched alkyl (meth)acrylates such as methyl (meth)acrylate, ethyl (meth)acrylate, butyl (meth) acrylate, 2-ethylhexyl (meth)acrylate, lauryl (meth)acrylate, and stearyl (meth)acrylate; cyclic alkyl (meth)acrylates such as cyclohexyl (meth)acrylate; aromatic (meth)acrylates such as benzyl (meth)acrylate, and phenoxyethyl (meth)acrylate; hydrophobic polyalkylene glycol (meth)acrylates such as polypropylene glycol (meth)acrylate; and styrene monomers such as styrene, methylstyrene, and chloromethylstyrene. One or more of these may be used.

As needed, the monomer composition may contain a solvent. As the solvent, one not reacting under the polymerization condition is usable, and examples thereof include water, aliphatic alcohols such as ethyl alcohol, propyl alcohol, amyl alcohol, and hexanol, aprotic polar solvents such as dimethylformamide, and dimethyl sulfoxide, chlorine-based solvents such as chloroform; and an appropriate mixed solvent of two or more of these.

The monomer of the present invention may be copolymerized with the above-mentioned polymerizable monomer according to a conventionally known method. For example, the copolymerization can be carried out using a known polymerization initiator such as a thermal polymerization initiator or a photopolymerization initiator. The polymerization initiator includes 2-hydroxy-2-methyl-1-phenyl-propan-1-one, 2,2'-azobis(isobutyronitrile), azobisdimethylvaleronitrile, benzoyl peroxide, tert-butyl hydroperoxide, cumene hydroperoxide, Phenylbis(2,4,6-trimethylbenzoyl) phosphine oxide, 2-hydroxy-2-methylpropiophenone, and the like. One alone or two or more kinds of these polymerization initiators can be used either singly or as combined.

The ophthalmic device of the present invention is formed of the hydrogel of the present invention, and examples of the ophthalmic device include contact lenses, intraocular lenses and artificial corneas.

For example, in the case where a contact lens is produced as the ophthalmic device, the monomer composition may be polymerized according to a known method, for example, using an arbitrary polymerization method of thermal polymerization, photopolymerization, or mold polymerization.

In producing a contact lens, it can be sterilized under any condition, and for example, after packaged the contact lens, preferably, it is thermally sterilized at 80° C. to 140° C.

The water content of the contact lens is preferably 30% by mass or more and less than 40% by mass relative to the contact lens, more preferably 32 to 39% by mass. When the water content is less than 30% by mass, the contact lens can hardly be hydrophilic, but when it is 40% or more, there is concern that reduction in dry feeling could not be attained.

EXAMPLES

Hereinunder the present invention is described specifically with reference to Examples.

Various measurements in Examples were carried out according to the following methods.

$^1$H-NMR (proton nuclear magnetic resonance) spectra were measured, using JNM-ECS400 Model by JEOL Ltd.

In the measurement, heavy water was used as the solvent, and the peak (4.79 ppm) of water was the internal standard.

The liquid chromatography mass spectrometry (LC-MS) was carried out according to an ESI ionization method using e2695/SQ-Detector 2 (by Waters Corporation).

In the measurement, a mixed solvent of acetonitrile/50 mM ammonium acetate water of 10/90 by volume was used as an eluent, Inertsil ODS-3V (by GL Science Inc.) was used as a column, and the sample was dissolved in the eluate at a concentration of 100 ppm.

Example 1-1

Synthesis of 2-(2-vinyloxyethoxy)ethyl-2-(trimethylammonio)ethyl phosphate

In a 1-L four-neck flask equipped with a condenser tube, a thermometer and a stirrer, 42.8 g of 2-chloro-2-oxo-1,3,2-dioxophosphorane (COP) and 224.4 g of ethyl acetate were put, and well mixed. In a dropping funnel, 39.6 g of diethylene glycol monovinyl ether, 60.7 g of diisopropylamine and 100.4 g of ethyl acetate were put, and mixed and dissolved. The dropping funnel was fitted to the 1-L four-neck flask, and the mixture was gradually dropwise added thereto at −5 to 0° C. After the dropwise addition, these were reacted at −5 to 5° C. for 2 hours. After the reaction, the white precipitate seen in the resultant reaction liquid was separated by filtration using filter paper having a pore size of 7 μm, and the filtered deposit on the filter paper was washed by filtration with 32.5 g of ethyl acetate.

396.9 g of the filtrate and 300.0 g of an acetonitrile solution of trimethylamine (concentration: 2 mol/L) were put into a pressure-resistant bottle and sealed up. Subsequently, this was heated up to 75° C., and reacted for 6 hours. After the reaction, this was cooled down to 40° C., and excessive trimethylamine and solvent were removed by blowing nitrogen thereinto.

The resultant liquid was analyzed by LC-MS, and was identified to be a compound represented by the formula (1a), as having a molecular weight of 297.

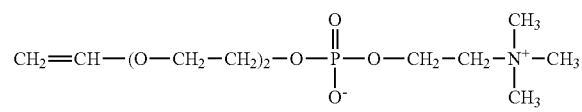

(1a)

$^1$H-NMR measurement results are shown below.
CH$_2$=CH—: 6.53 ppm (1H),
CH$_2$=CH—: 4.36 ppm (1H), 4.32 ppm (1H),
—O—CH$_2$—CH$_2$—N—: 4.30 ppm (2H)
—O—CH$_2$—CH$_2$—O—P—: 4.02 ppm (2H)
CH—O—CH$_2$—: 3.92 ppm (2H)
—O—CH$_2$—CH$_2$—O—CH$_2$—: 3.81 ppm (2H)
—O—CH$_2$—CH$_2$—O—P—: 3.75 ppm (2H)
CH$_2$—N: 3.65 ppm (2H)
—N—(CH$_3$)$_3$: 3.21 ppm (9H)

Example 1-2

Synthesis of 4-(vinyloxy)butyl-2-(trimethylammonio)ethyl phosphate

In a 1-L four-neck flask equipped with a condenser tube, a thermometer and a stirrer, 42.8 g of 2-chloro-2-oxo-1,3, 2-dioxophosphorane (COP) and 224.4 g of ethyl acetate were put, and well mixed. In a dropping funnel, 34.8 g of 4-hydroxybutyl monovinyl ether, 60.7 g of diisopropylamine and 95.6 g of ethyl acetate were put, and mixed and dissolved. The dropping funnel was fitted to the 1-L four-neck flask, and the mixture was gradually dropwise added thereto at −5 to 0° C. After the dropwise addition, these were reacted at −5 to 5° C. for 2 hours. After the reaction, the white precipitate seen in the resultant reaction liquid was separated by filtration using filter paper having a pore size of 7 μm, and the filtered deposit on the filter paper was washed by filtration with 32.0 g of ethyl acetate.

387.3 g of the filtrate and 300.0 g of an acetonitrile solution of trimethylamine (concentration: 2 mol/L) were put into a pressure-resistant bottle and sealed up. Subsequently, this was heated up to 75° C., and reacted for 6 hours. After the reaction, this was cooled down to 40° C., and excessive trimethylamine and solvent were removed by blowing nitrogen thereinto.

The resultant liquid was analyzed by LC-MS, and was identified to be a compound represented by the formula (1b), as having a molecular weight of 281.

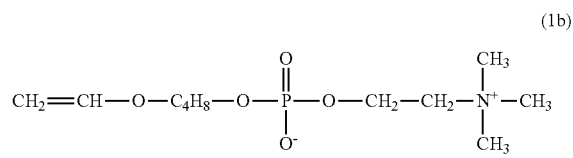

(1b)

$^1$H-NMR measurement results are shown below.
- $CH_2=CH-$: 6.45 ppm (1H),
- $CH_2=CH-$: 4.30 ppm (1H), 4.09 ppm (1H),
- $-P-O-CH_2-CH_2-N-$: 4.24 ppm (2H),
- $-CH_2-CH_2-CH_2-O-P-$: 3.87 ppm (2H),
- $-CH-O-CH_2-$: 3.79 ppm (2H),
- $-CH_2-N$: 3.62 ppm (2H),
- $-N-(CH_3)_3$: 3.21 ppm (9H),
- $-CH_2-CH_2-CH_2-CH_2-$: 1.70 ppm (4H)

Components used in Examples and Comparative Examples are shown below.
- ES: 2-(methacryloyloxy)ethyl=3-[tris(trimethylsiloxy)silyl]propyl=succinate
- PDMS: monomethacrylate terminated polydimethylsiloxane having a molecular weight of about 1,000
- HEMA: 2-hydroxyethyl methacrylate
- NVP: N-vinylpyrrolidone
- MPC: 2-methacryloyloxyethylphosphorylcholine
- HeOH: hexanol
- TEGDMA: tetraethylene glycol dimethacrylate
- TEGDV: triethylene glycol divinyl ether
- AIBN: 2,2'-azobis(isobutyronitrile)

Contact lenses (model contact lenses) of Examples and Comparative Examples were evaluated in point of the following evaluation items.

[Transparency of Contact Lens]

After purified, the polymer was immersed in physiological saline described in ISO-18369-3, and the resultant swollen hydrogel was used as a model contact lens and evaluated in point of visual standards of "transparency", "slight turbidity" and "white turbidity".

[Surface Hydrophilicity of Contact Lens (WBUT)]

The surface hydrophilicity of the contact lens was evaluated by WBUT (water film break up time) as follows. A model contact lens was immersed overnight in the ISO physiological saline, and pulled up from the water surface by picking up the outer periphery thereof with tweezers. The period of time from the time when the lens was pulled up from the water surface to the time when the water film on the lens surface broke (water film retention time) was measured. The judgement of the water film retention time was visually checked. The measurement was repeated three times, and an average value was calculated. A case having a water film retention time of 30 seconds or more is determined to have good surface hydrophilicity.

[Water Content of Contact Lens]

The water content of a model contact lens was measured according to the method described in ISO-18369-4.

Example 2-1

0.72 g (14.6% by mass) of the compound of Example 1-1, 0.96 g (19.4% by mass) of ES, 1.44 g (29.1% by mass) of HEMA and 0.50 g (10.0% by mass) of HeOH were mixed in a container, and stirred at room temperature until the compound of Example 1 dissolved. Further, 0.96 g (19.4% by mass) of PDMS, 0.72 g (14.6% by mass) of NVP, 0.05 g (1.0% by mass) of TEGDMA, 0.10 g (1.9% by mass) of TEGDV and 0.05 g (1.0% by mass) of AIBN were added to the container, and stirred until it became uniform at room temperature to give a composition. The amount, % by mass of the initiator AINB and the solvent HeOH each is a value relative to 100 parts by mass of the monomer component.

0.3 g of the composition was cast into a cell of 25 mm×70 mm×0.2 mm formed by inserting a spacer of a polyethylene terephthalate sheet having a thickness of 0.1 mm between two polypropylene plates, and purged with nitrogen inside an oven. Next, this was heated up to 65° C., kept at 65° C. for 3 hours, and then further heated up to 120° C., and kept at 120° C. for 2 hours to thereby polymerize the composition to give a polymer.

The polymer was taken out of the cell, then immersed in 40 g of 2-propanol for 4 hours, and further immersed in 50 g of ion-exchanged water for 4 hours to remove the unreacted substances for purification. The purified polymer was immersed in physiological saline described in ISO-18369-3 and was thus swollen (hydrated) to prepare a model contact lens.

The resultant model contact lens was cut to have a size and a shape suitable for the above evaluation, and evaluated.

The blend ratio of the constituent components in the composition, and the evaluation results are shown in Table 1.

Examples 2-2 to 2-4, Comparative Examples 1, 2

Model contact lenses of other Examples and Comparative Examples were prepared in the same manner as in Example 2-1, except that the blend ratio of the constituent components in the composition was as in Table 1. The model contact lenses of the other Examples and Comparative Examples also evaluated in the same manner as in Example 2-1. The results are shown in Table 1.

TABLE 1

|  |  |  | Example 2-1 | Example 2-2 | Example 2-3 | Example 2-4 | Comparative Example 1 | Comparative Example 2 |
|---|---|---|---|---|---|---|---|---|
| Monomer Components (% by mass) | Compound of Formula (1) | Compound of Example 1-1 | 14.6 | 9.8 | 0.0 | 0.0 | 0.0 | 0.0 |
|  |  | Compound of Example 1-2 | 0.0 | 0.0 | 14.6 | 9.8 | 0.0 | 0.0 |
|  | Silicone Monomer | ES | 19.4 | 19.4 | 19.4 | 19.4 | 19.4 | 19.4 |
|  |  | PDMS | 19.4 | 19.4 | 19.4 | 19.4 | 19.4 | 19.4 |
|  | Hydrophilic | MPC | 0.0 | 0.0 | 0.0 | 0.0 | 14.6 | 0.0 |
|  | Other Monomer | HEMA | 29.1 | 29.1 | 29.1 | 29.1 | 29.1 | 38.9 |
|  |  | NVP | 14.6 | 19.4 | 14.6 | 19.4 | 14.6 | 19.4 |
|  | Polyfunctional Compound | TEGDMA | 1.0 | 1.0 | 1.0 | 1.0 | 1.0 | 1.0 |
|  |  | TEGDV | 1.9 | 1.9 | 1.9 | 1.9 | 1.9 | 1.9 |
|  | Total |  | 100.0 | 100.0 | 100.0 | 100.0 | 100.0 | 100.0 |
| Initiator (% by mass) |  | AIBN | 1.0 | 1.0 | 1.0 | 1.0 | 1.0 | 1.0 |
| Solvent (% by mass) |  | HeOH | 10.0 | 10.0 | 10.0 | 10.0 | 10.0 | 10.0 |
| Evaluation |  | Transparency | Transparent | Transparent | Transparent | Transparent | Transparent | Transparent |
|  |  | WBUT (s) | >30 | >30 | >30 | >30 | >30 | 5 |
|  |  | Water Content (%) | 35 | 39 | 33 | 38 | 55 | 35 |

The hydrogels (contact lenses) of Examples have a reduced water content while maintaining surface hydrophilicity, from which it is known that the phosphorylcholine group-containing vinyl monomer of the present invention is useful as a raw material for a hydrogel for use for contact lenses, etc.

The invention claimed is:

1. A phosphorylcholine group-containing vinyl monomer of formula (1):

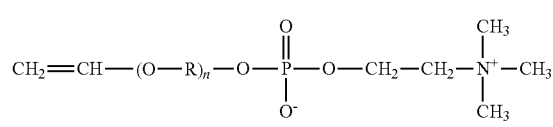

(1)

wherein R represents an alkylene group having 1 to 6 carbon atoms, and n represents an integer of 2 to 6.

2. The phosphorylcholine group-containing vinyl monomer of claim 1, wherein R represents an alkylene group having 1 to 4 carbon atoms.

3. The phosphorylcholine group-containing vinyl monomer of claim 1, wherein R represents an alkylene group having 3 to 4 carbon atoms.

4. The phosphorylcholine group-containing vinyl monomer of claim 1, wherein n represents an integer of 2 to 4.

5. A copolymer, comprising:
a structural unit derived from the monomer of claim 1.

6. A hydrogel, comprising:
the copolymer of claim 2.

7. An ophthalmic device, comprising:
the hydrogel of claim 3.

* * * * *